(12) United States Patent
Gupta et al.

(10) Patent No.: US 9,330,256 B2
(45) Date of Patent: May 3, 2016

(54) LOCATION BASED PROCESS-MONITORING

(71) Applicant: QUALCOMM Incorporated, San Diego, CA (US)

(72) Inventors: Rajarshi Gupta, Sunnyvale, CA (US); Saumitra Mohan Das, Santa Clara, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 13/757,268

(22) Filed: Feb. 1, 2013

(65) Prior Publication Data

US 2014/0223553 A1    Aug. 7, 2014

(51) Int. Cl.

| | |
|---|---|
| *G06F 21/55* | (2013.01) |
| *G06F 21/52* | (2013.01) |
| *G06F 21/57* | (2013.01) |
| *H04M 1/725* | (2006.01) |
| *H04W 4/02* | (2009.01) |
| *H04W 12/12* | (2009.01) |
| *H04L 29/06* | (2006.01) |

(52) U.S. Cl.
CPC .............. *G06F 21/552* (2013.01); *G06F 21/52* (2013.01); *G06F 21/577* (2013.01); *H04L 63/1433* (2013.01); *H04M 1/72572* (2013.01); *H04W 4/02* (2013.01); *H04W 12/12* (2013.01); *H04L 63/107* (2013.01); *H04L 63/1416* (2013.01)

(58) Field of Classification Search
CPC .. H04L 63/1433; G06F 21/552; G06F 21/577
See application file for complete search history.

(56) References Cited

U.S. PATENT DOCUMENTS

| 7,051,196 B2 | 5/2006 | Angelo et al. |
| 7,054,614 B1 | 5/2006 | Hunzinger |
| 7,591,020 B2 * | 9/2009 | Kammer et al. ................ 726/26 |

(Continued)

FOREIGN PATENT DOCUMENTS

EP        1653386 A2     5/2006

OTHER PUBLICATIONS

Minch, Dr. Robert P.; "Privacy Issues in Location-Aware Mobile Devices", Proceedings of the 37th Annual Hawaii International Conference on System Sciences, Jan. 5-8, 2004, IEEE, 10 pages.*

(Continued)

*Primary Examiner* — Victor Lesniewski
(74) *Attorney, Agent, or Firm* — Hunter Clark PLLC (57) ABSTRACT

Disclosed are systems, apparatus, devices, methods, computer program products, and other implementations, including a method that includes determining location of a device, and controlling monitoring of behavior of one or more processes executing on the device based on the determined location of the device to identify potential one or more security-risky processes from the monitored one or more executing processes. In some embodiments, controlling the monitoring of the behavior of the one or more processes may include one or more of, for example, adjusting frequency of the monitoring of the one or more processes based on the determined location of the device, adjusting level of detail obtained for the monitored behavior of the one or more processes based on the determined location of the device, and/or adjusting features being observed for the monitored one or more processes based on the determined location of the device.

46 Claims, 4 Drawing Sheets

(56) References Cited

U.S. PATENT DOCUMENTS

| | | | |
|---|---|---|---|
| 7,633,438 B2* | 12/2009 | Tysowski | 342/357.64 |
| 7,788,281 B2* | 8/2010 | Cole et al. | 707/792 |
| 8,131,846 B1* | 3/2012 | Hernacki | G06F 21/552 709/219 |
| 8,271,057 B2* | 9/2012 | Levine et al. | 455/574 |
| 8,380,179 B2* | 2/2013 | Appaji | 455/418 |
| 8,412,647 B2* | 4/2013 | Hotes et al. | 706/12 |
| 8,558,662 B2* | 10/2013 | Nakajima et al. | 340/5.3 |
| 8,606,260 B2* | 12/2013 | Chatterjee | 455/424 |
| 8,682,960 B2* | 3/2014 | Strandell et al. | 709/203 |
| 2003/0105971 A1 | 6/2003 | Angelo et al. | |
| 2005/0182750 A1* | 8/2005 | Krishna | G06F 11/3438 |
| 2006/0206941 A1* | 9/2006 | Collins | 726/25 |
| 2007/0129084 A1* | 6/2007 | Sylvain | H04W 64/00 455/456.1 |
| 2008/0052395 A1 | 2/2008 | Wright et al. | |
| 2008/0096529 A1 | 4/2008 | Zellner | |
| 2008/0172746 A1* | 7/2008 | Lotter | G06F 21/552 726/26 |
| 2008/0244704 A1* | 10/2008 | Lotter | G06F 21/552 726/3 |
| 2009/0253408 A1* | 10/2009 | Fitzgerald | G06F 21/316 455/411 |
| 2010/0251365 A1* | 9/2010 | Lyne et al. | 726/22 |
| 2010/0306138 A1* | 12/2010 | Hotes et al. | 706/12 |
| 2011/0023115 A1* | 1/2011 | Wright | G06F 21/552 726/22 |
| 2011/0023118 A1* | 1/2011 | Wright | G06F 11/28 726/23 |
| 2011/0078137 A1* | 3/2011 | Sudit et al. | 707/722 |
| 2011/0087495 A1* | 4/2011 | O'Neill | G06Q 10/10 705/1.1 |
| 2011/0099037 A1* | 4/2011 | Levin et al. | 705/5 |
| 2011/0209215 A1* | 8/2011 | Kabbara | H04L 63/1425 726/22 |
| 2011/0244887 A1* | 10/2011 | Dupray et al. | 455/456.2 |
| 2012/0066763 A1* | 3/2012 | McHugh | G06F 21/577 726/22 |
| 2012/0102549 A1 | 4/2012 | Mazzaferri et al. | |
| 2012/0157039 A1* | 6/2012 | Lotter | G06F 21/552 455/405 |
| 2012/0242906 A1* | 9/2012 | Shintani et al. | 348/730 |
| 2013/0095837 A1* | 4/2013 | Zhou et al. | 455/440 |
| 2013/0298244 A1* | 11/2013 | Kumar et al. | 726/25 |
| 2014/0172478 A1* | 6/2014 | Vadasz | 705/7.15 |

OTHER PUBLICATIONS

International Search Report and Written Opinion—PCT/US2014/010947—ISAEPO—Apr. 22, 2014.

International Preliminary Report on Patentability—PCT/US2014/010947—The International Bureau of WIPO Geneva, Switzerland, Jan. 12, 2015, 6 pgs.

Dixon B., et al., "Location based power analysis to detect malicious code in smartphones," Security and Privacy in Smartphones and Mobile Devices, ACM, 2 Penn Plaza, Suite 701 New York, NY, 10121-0701, USA, Oct. 17, 2011, pp. 27-32, XP058005977, DOI: 10.1145/2046614.2046620 ISBN: 978-1-4503-1 000-0.

* cited by examiner

LOCATION BASED PROCESS-MONITORING

BACKGROUND

Mobile devices may hold a lot of personal information, and may be susceptible to attacks by malicious applications. Some security mechanisms are configured to detect malicious processes on a mobile device through performance of real-time behavioral analysis of mobile processes that enable detection of anomalous behavior. There are also various situations where behavior of a mobile device, even if not caused by malicious processes, may constitute a security-risk (for example, situations of frequent camera use in a security-sensitive area, such as a government building, a hospital, a bank, etc.)

To detect anomalous behavior of processes executing on a mobile device, the various processes executing on the device need to observed/monitored, and the monitored behavior then needs to be analyzed. If these processes were to be continually monitored or observed, the performance costs (e.g., computational cost, power use, etc.) associated with such continual monitoring might be high.

SUMMARY

Thus, in some variations, a method is disclosed. The method includes determining location of a device, and controlling monitoring of behavior of one or more processes executing on the device based on the determined location of the device to identify potential one or more security-risky processes from the monitored one or more executing processes.

Embodiments of the method may include at least some of the features described in the present disclosure, including one or more of the following features.

The one or more security-risky processes may include one or more of, for example, a malicious process of a third party, and/or a process initiated by a user of the device that causes a potential security risk.

Determining the location of the device may include determining one or more of, for example, a global geographical position coordinates corresponding to the location of the device, a location context identifier for the device, and/or another identifier associated with the location of the device.

Determining the location of the device may include determining whether the location of the device includes one or more of, for example, a secure public location, a non-secure public location, a secure private location, and/or a non-secure private location.

Controlling the monitoring of the behavior of the one or more processes executing on the device based on the determined location of the device may include one or more of, for example, adjusting frequency of the monitoring of the one or more processes executing on the device based on the determined location of the device, and/or adjusting level of detail obtained for the monitored behavior of the one or more processes executing on the device based on the determined location of the device.

Adjusting the frequency of the monitoring of the one or more processes executing on the device may include increasing the frequency of observation of at least one of the one or more processes executing on the device in response to a determination that the device is located in a secure location.

Adjusting the level of detail obtained for the monitored behavior of the one or more processes executing on the device may include increasing the level of detail obtained for at least one of the one or more processes executing on the device in response to a determination that the device is located in a secure location.

Controlling the monitoring of the behavior of the one or more processes executing on the device based on the determined location of the device may include adjusting features being observed for the monitored one or more processes executing on the device based on the determined location of the device.

The method may further include identifying the monitored behavior of at least one of the one or more processes as potentially malicious behavior based on the determined location of the device.

Identifying the monitored behavior of the at least one of the one or more processes as potentially malicious behavior may include identifying the monitored behavior of the at least one of the one or more processes as potentially malicious behavior in response to a determination that number of uses of a particular feature exceeds a pre-determined threshold when the device is determined to be in a secure location.

The particular feature may include at least one of, for example, image capturing using a camera of the device, and/or data transfer over a communication link between the device and a remote device.

Identifying the monitored behavior of the at least one of the one or more processes as potentially malicious behavior may include identifying the monitored behavior of the at least one of the one or more processes as potentially malicious behavior using a machine-learning procedure.

In some variations, a mobile device is disclosed. The mobile device includes one or more processors, and storage media comprising computer instructions. The computer instructions, when executed on the one or more processors, cause operations including determining location of the device, and controlling monitoring of behavior of one or more processes executing on the device based on the determined location of the device to identify potential one or more security-risky processes from the monitored one or more executing processes.

Embodiments of the device may include at least some of the features described in the present disclosure, including at least some of the features described above in relation to the method.

In some variations, an apparatus is disclosed. The apparatus includes means for determining location of a device, and means for controlling monitoring of behavior of one or more processes executing on the device based on the determined location of the device to identify potential one or more security-risky processes from the monitored one or more executing processes.

Embodiments of the apparatus may include at least some of the features described in the present disclosure, including at least some of the features described above in relation to the method and the device, as well as one or more of the following features.

The means for determining the location of the device may include means for determining one or more of, for example, a global geographical position coordinates corresponding to the location of the device, a location context identifier for the device, and/or another identifier associated with the location of the device.

The means for determining the location of the device may include means for determining whether the location of the device includes one or more of, for example, a secure public location, a non-secure public location, a secure private location, and/or a non-secure private location.

The means for controlling the monitoring of the behavior of the one or more processes executing on the device based on the determined location of the device may include one or more of, for example, means for adjusting frequency of the monitoring of the one or more processes executing on the device based on the determined location of the device, and/or means for adjusting level of detail obtained for the monitored behavior of the one or more processes executing on the device based on the determined location of the device.

The means for adjusting the frequency of the monitoring of the one or more processes executing on the device may include means for increasing the frequency of observation of at least one of the one or more processes executing on the device in response to a determination that the device is located in a secure location.

The means for adjusting the level of detail obtained for the monitored behavior of the one or more processes executing on the device may include means for increasing the level of detail obtained for at least one of the one or more processes executing on the device in response to a determination that the device is located in a secure location.

The means for controlling the monitoring of the behavior of the one or more processes executing on the device based on the determined location of the device may include means for adjusting features being observed for the monitored one or more processes executing on the device based on the determined location of the device.

The apparatus may further include means for identifying the monitored behavior of at least one of the one or more processes as potentially malicious behavior based on the determined location of the device.

The means for identifying the monitored behavior of the at least one of the one or more processes as potentially malicious behavior may include means for identifying the monitored behavior of the at least one of the one or more processes as potentially malicious behavior in response to a determination that number of uses of a particular feature exceeds a predetermined threshold when the device is determined to be in a secure location.

The means for identifying the monitored behavior of the at least one of the one or more processes as potentially malicious behavior may include means for identifying the monitored behavior of the at least one of the one or more processes as potentially malicious behavior using a machine-learning procedure.

In some variations, a processor readable media programmed with a set of instructions executable on a processor is disclosed. The set of instructions, when executed, cause operations including determining location of a device, and controlling monitoring of behavior of one or more processes executing on the device based on the determined location of the device to identify potential one or more security-risky processes from the monitored one or more executing processes.

Embodiments of the processor-readable media may include at least some of the features described in the present disclosure, including at least some of the features described above in relation to the method, device, and apparatus.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Other and further objects, features, aspects, and advantages of the present disclosure will become better understood with the following detailed description of the accompanying drawings.

BRIEF DESCRIPTION OF THE DRAWING

Like reference symbols in the various drawings indicate like elements.

DESCRIPTION

To improve process monitoring operations, observation/monitoring of the device's activities/processes may be controlled (e.g., modified/adjusted, or maintained) based on location of the device. For example, if the device is determined to be in a high security area (e.g., a government building, a hospital), the frequency of observation may be increased from the frequency of observation used in non-secure areas (e.g., when the device is at a user's home). Additionally, in some embodiments, processing to determine whether observed behavior of a device's processes/applications/activities constitute malicious behavior may also be controlled/modified/adjusted based on the location of the device.

Thus, disclosed herein are methods, devices, systems, apparatus, products, and other implementations, including a method that includes determining location of a device, and controlling monitoring of behavior of one or more processes (also referred to as activities or applications) executing on the device based on the determined location (e.g., secure or non-secure locations) of the device to identify potential one or more security-risky processes from the monitored one or more executing processes. Security-risky processes may include, for example, a malicious process of a third party, and/or a process initiated by a user of the device that causes a potential security risk. For example, as noted, if a device is located in a security sensitive area, an otherwise legitimate process, such as capturing images by an on-board camera, may constitute a security-risky process at that particular location. In some embodiments, controlling the monitoring operations may include, for example, adjusting frequency of the monitoring operations based on the determined location of the device (e.g., to more frequently monitor external communication processes when the device is determined to be in a secure area), adjusting level of detail obtained for the monitored behavior of the one or more processes executing on the device based on the determined location of the device, etc.

In some embodiments, the determined location of the mobile device (based on which process monitoring may be controlled) may be provided as a global geographical position coordinates corresponding to the location of the device, and/or as a location context identifier for the device (e.g., indicating a floor of a building where the device is located, or some other type of an identifiable geographic region where the device may be located). The current location of the device may also be identified according to whether the device is located in a secure or non-secure area, and/or whether the device is in a public or private location.

Figure 1:
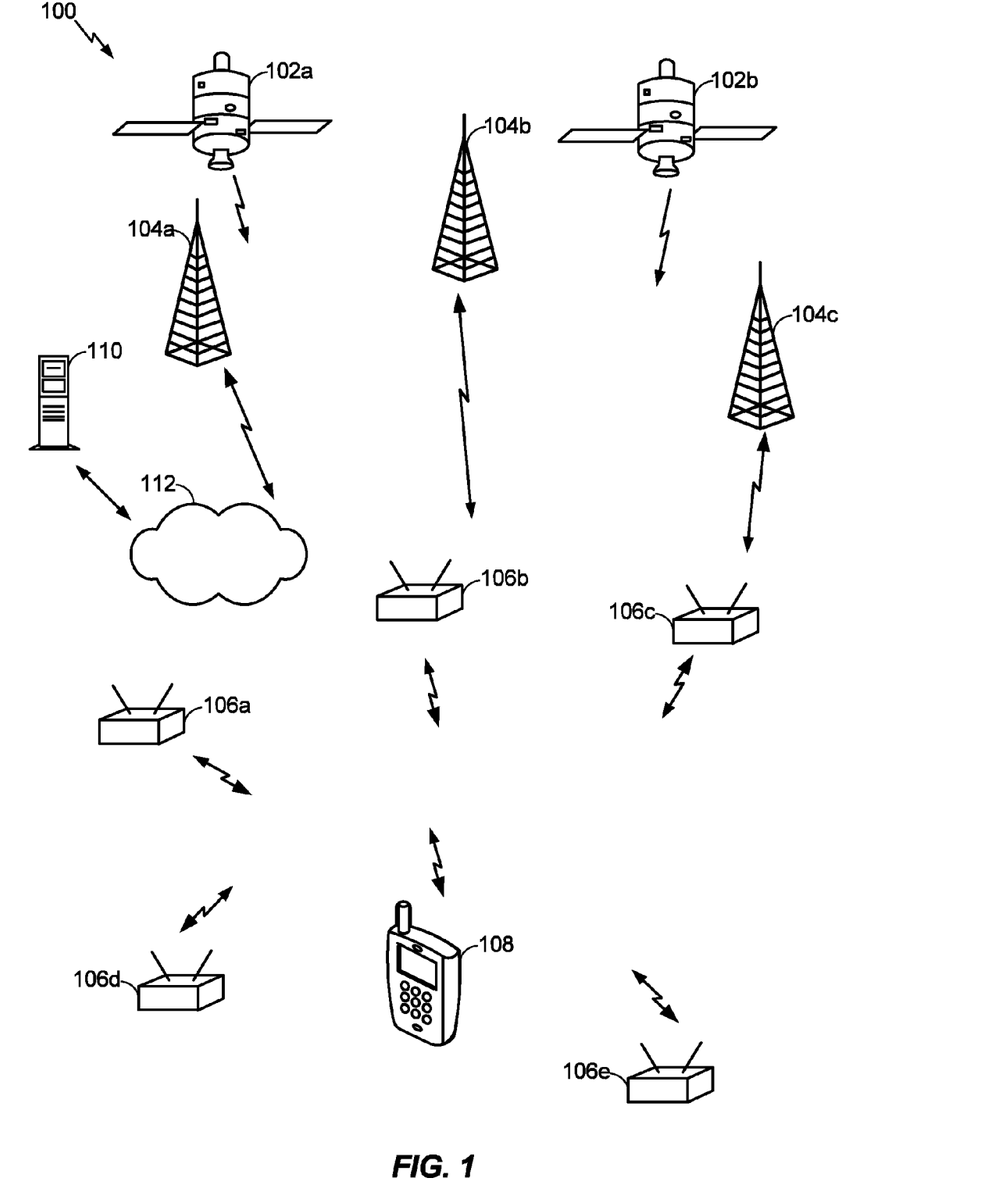
FIG. 1 is a schematic diagram of an example operating environment in which a mobile device may operate.

With reference to FIG. 1, shown is a schematic diagram of an example operating environment 100 in which a mobile device 108, e.g., a mobile device configured to perform process monitoring controlled based on the device's location, operates. The mobile device (also referred to as a wireless device or as a mobile station) 108 may be configured, in some embodiments, to operate and interact with multiple types of other communication systems/devices, including local area network devices (or nodes), such as WLAN for indoor communication, femtocells, Bluetooth-based transceivers, and other types of indoor communication network nodes, wide area wireless network nodes, satellite communication systems, etc., and as such the mobile device 108 may include one or more interfaces to communicate with the various types of communications systems. As used herein, communication systems/devices with which the mobile device 108 may communicate are also referred to as access points (AP's).

As noted, and as will be discussed in greater detail below, the mobile device is configured to also determine location of a device and to control monitoring of behavior of one or more activities/processes executing on the device based on the determined location of the device to identify potential one or more security-risky activities/processes from the monitored one or more executing activities/processes. In other words, the device is configured to control (e.g., modify, maintain, etc.) its monitoring functionality based on the determined location of the device such that monitoring various processes, activities, and operations executing on a device varies depending on where the device is located.

As also noted, the environment 100 may contain one or more different types of wireless communication systems or nodes. Such nodes, also referred to as wireless access points (or WAPs) may include LAN and/or WAN wireless transceivers, including, for example, WiFi base stations, femto cell transceivers, Bluetooth transceivers, cellular base stations, WiMax transceivers, etc. Thus, for example, and with continued reference to FIG. 1, the environment 100 may include Local Area Network Wireless Access Points (LAN-WAPs) 106a-e that may be used for wireless voice and/or data communication with the mobile device 108. The LAN-WAPs 106a-e may also be utilized as independents sources of position data, e.g., through implementation of multilateration-based procedures based, for example, on time of arrival techniques. The LAN-WAPs 106a-e can be part of a Wireless Local Area Network (WLAN), which may operate in buildings and perform communications over smaller geographic regions than a WWAN. Additionally in some embodiments, the LAN-WAPs 106a-e could also be pico or femto cells. In some embodiments, the LAN-WAPs 106a-e may be part of, for example, WiFi networks (802.11x), cellular piconets and/or femtocells, Bluetooth Networks, etc. The LAN-WAPs 106a-e can also include a Qualcomm indoor positioning system (QUIPS™). A QUIPS implementation may, in some embodiments, be configured so that a mobile device can communicate with a server that provides the device with data (such as to provide the assistance data, e.g., maps, RF heatmaps, connectivity information, etc.) for a particular floor or some other region where the mobile device is located. Although five (5) LAN-WAP access points are depicted in FIG. 1, any number of such LAN-WAP's may be used, and, in some embodiments, the environment 100 may include no LAN-WAPs access points at all, or may include a single LAN-WAP access point. Furthermore, each of the LAN-WAPs 106a-e depicted in FIG. 1 may be a moveable node, or may be otherwise capable of being relocated.

As further shown in FIG. 1, the environment 100 may also include a plurality of one or more types of Wide Area Network Wireless Access Points (WAN-WAPs) 104a-c, which may be used for wireless voice and/or data communication, and may also serve as another source of independent information through which the mobile device 108 may determine its position/location. The WAN-WAPs 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-104c within the WWAN may operate from fixed positions, and provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP. Additionally, each of the WAN-WAPs 104a-c depicted in FIG. 1 may be a moveable node, or may otherwise be capable of being relocated.

Communication to and from the mobile device 108 (to exchange data, enable position determination of the device 108, etc.) may thus also be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP).

Cdma2000 is described in documents from a consortium named "3rd Generation Partnership Project 2" (3GPP2). 3GPP and 3GPP2 documents are publicly available. A WLAN may also be implemented, at least in part, using an IEEE 802.11x network, and a WPAN may be a Bluetooth network, an IEEE 802.15x, or some other type of network. The techniques described herein may also be used for any combination of WWAN, WLAN and/or WPAN.

When deriving position using the access points 104a-b and/or 106a-e, the mobile device 108 may utilize, for example, time of arrival techniques, optionally with the assistance of a positioning server 110 and a network 112. The positioning server (also referred to as a location manager) 110 may communicate with the mobile device 108 through the network 112.

In some embodiments, and as further depicted in FIG. 1, the mobile device 108 may also be configured to at least receive information from satellites of a Satellite Positioning System (SPS) 102a-b, which may be used as an independent source of position information for the mobile device 108. The mobile device 108 may thus include one or more dedicated SPS receivers specifically designed to receive signals for deriving geo-location information from the SPS satellites. Thus, in some embodiments, the mobile device 108 may communicate with any one or a combination of the SPS satellites 102a-b, the WAN-WAPs 104a-c, and/or the LAN-WAPs 106a-e. In some embodiments, each of the aforementioned systems can provide an independent information estimate of the position for the mobile device 108 using different techniques. In some embodiments, the mobile device may combine the solutions derived from each of the different types of access points to improve the accuracy of the position data.

In embodiments in which the mobile device 108 can receive satellite signals, the mobile device may utilize a receiver (e.g., a GNSS receiver) implemented for use with the SPS to extract position data from a plurality of signals transmitted by the SPS satellites 102a-b. Transmitted satellite signals may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

In some embodiments, the techniques/procedures presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As used herein, a mobile device or station (MS) refers to a device such as a cellular or other wireless communication device, personal communication system (PCS) device, personal navigation device (PND), Personal Information Manager (PIM), Personal Digital Assistant (PDA), a tablet device, a laptop or some other suitable mobile device which may be capable of receiving wireless/cellular communication and/or navigation signals, such as navigation positioning signals. The term "mobile station" (or "mobile device") is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, "mobile station" is intended to include all devices, including wireless communication devices, computers, laptops, tablet, etc., which are capable of communication with a server, such as via the Internet, WiFi, or other network, regardless of whether satellite signal reception, assistance data reception, and/or position-related processing occurs at the device, at a server, or at another device associated with the network. Any operable combinations of the above are also considered a "mobile station."

Figure 2:
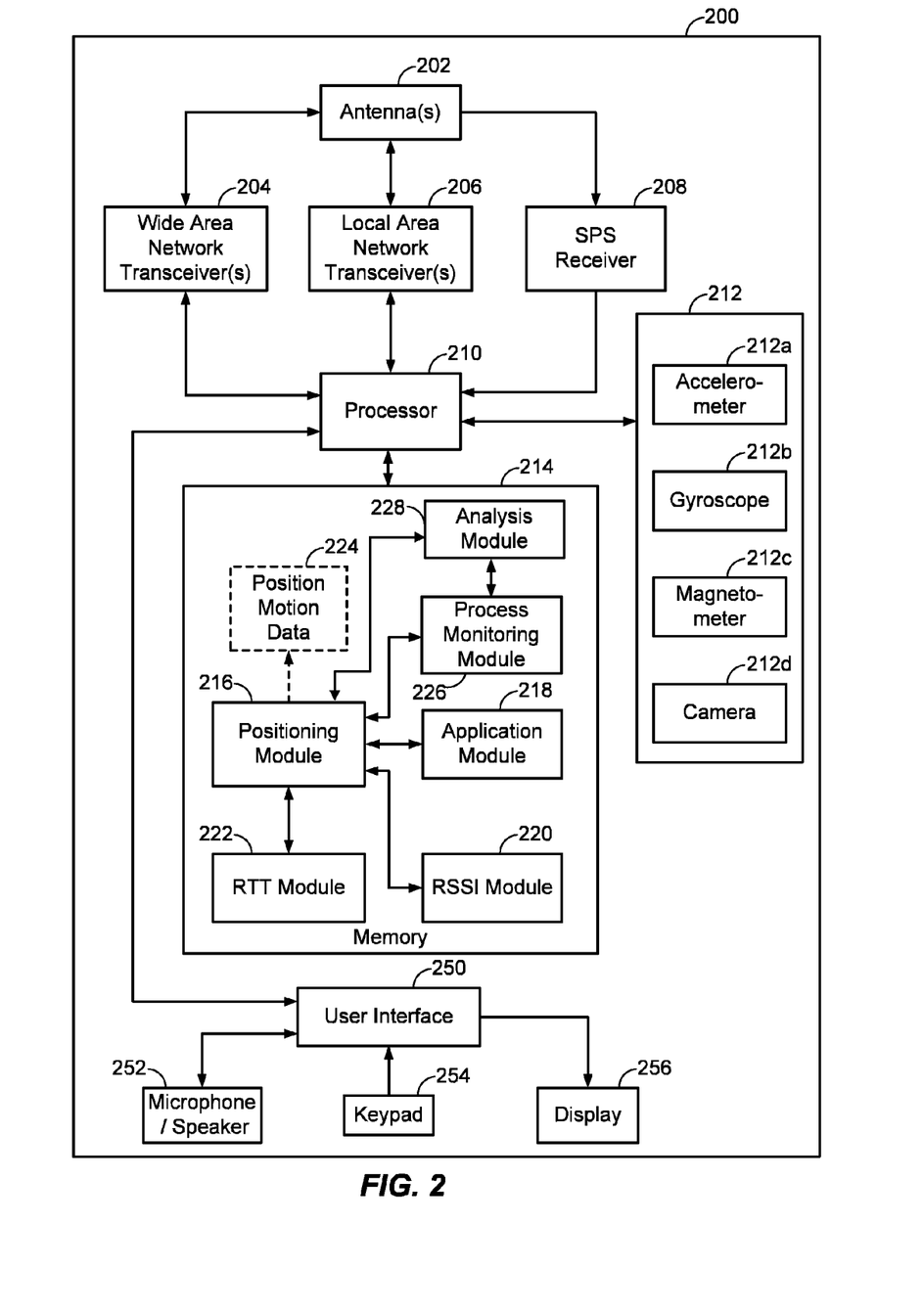
FIG. 2 is a schematic diagram of an example mobile device.

With reference now to FIG. 2, a schematic diagram illustrating various components of an example mobile device 200, which may be similar to the mobile device 108 of FIG. 1, is shown. For the sake of simplicity, the various features/components/functions illustrated in the box diagram of FIG. 2 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 2 may be further subdivided, or two or more of the features or functions illustrated in FIG. 2 may be combined. Additionally, one or more of the features or functions illustrated in FIG. 2 may be excluded.

As shown, the mobile device 200 may include one or more local area network transceivers 206 that may be connected to one or more antennas 202. The one or more local area network transceivers 206 comprise suitable devices, hardware, and/or software for communicating with and/or detecting signals to/from one or more of the LAN-WAPs 106a-e depicted in FIG. 1, and/or directly with other wireless devices within a network. In some embodiments, the local area network transceiver(s) 206 may comprise a WiFi (802.11x) communication transceiver suitable for communicating with one or more wireless access points; however, in some embodiments, the local area network transceiver(s) 206 may be configured to communicate with other types of local area networks, personal area networks (e.g., Bluetooth), etc. Additionally, any other type of wireless networking technologies may be used, for example, Ultra Wide Band, ZigBee, wireless USB, etc.

The mobile device 200 may also include, in some implementations, one or more wide area network transceiver(s) 204 that may be connected to the one or more antennas 202. The wide area network transceiver 204 may comprise suitable devices, hardware, and/or software for communicating with and/or detecting signals from one or more of, for example, the WAN-WAPs 104a-c illustrated in FIG. 1, and/or directly with other wireless devices within a network. In some implementations, the wide area network transceiver(s) 204 may comprise a CDMA communication system suitable for communicating with a CDMA network of wireless base stations. In some implementations, the wireless communication system may comprise other types of cellular telephony networks, such as, for example, TDMA, GSM, etc. Additionally, any other type of wireless networking technologies may be used, including, for example, WiMax (802.16), etc.

In some embodiments, an SPS receiver (also referred to as a global navigation satellite system (GNSS) receiver) 208 may also be included with the mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 may request information as appropriate from the other systems, and may perform the computations necessary to determine the position of the mobile device 200 using, in part, measurements obtained by any suitable SPS procedure.

In some embodiments, the mobile device 200 may also include one or more sensors 212 coupled to a processor 210 (also referred to as a controller). For example, the sensors 212 may include motion sensors (also referred to as inertial sensors) to provide relative movement and/or orientation information which is independent of motion data derived from signals received by the wide area network transceiver(s) 204, the local area network transceiver(s) 206, and/or the SPS receiver 208. By way of example but not limitation, the motion sensors may include an accelerometer 212a, a gyroscope 212b, a geomagnetic (magnetometer) sensor 212c (e.g., a compass), an altimeter (e.g., a barometric pressure altimeter; not shown), and/or other sensor types. In some embodiments, the accelerometer 212a may be implemented based on micro-electro-mechanical-system (MEMS). Other types of accelerometers may be used in place of, or in addition to MEMS-based accelerometer. Additionally, a 3D accelerometer, comprising three perpendicularly placed accelerometers, may be implemented. In some embodiments, the gyroscope 212b may include a gyroscope based on MEMS technology, and may be a single-axis gyroscope, a double-axis gyroscope, or a 3-D gyroscope configured to sense motion about, for example, three orthogonal axes. Other types of gyroscopes may be used in place of, or in addition to MEMS-based gyroscope. In some embodiments, a magnetometer, configured to measure a magnetic field intensity and/or direction (and, thus, may be configured to measure absolute orientation with respect to the magnetic north) may also be implemented based, for example, on MEMS technology. Such MEMS-base magnetometers may be configured to detect motion caused by the Lorentz force produced by a current through a MEMS conductor. Other types of magnetometers may also be used. An altimeter may, for example, be configured to provide altitude data and thus may facilitate determining a floor in an indoor structure (e.g., an office building, a shopping mall, etc.) where the device may be located. Based on data representative of altitude measurements performed by the altimeter, navigation tasks, such as obtaining assistance data (including maps) for a particular floor in the indoor structure may be performed.

The output of the one or more sensors 212 may be combined in order to provide motion information. For example, estimated position of the mobile device 200 may be determined based on a previously determined position and distance traveled from that previously determined position as determined from the motion information derived from measurements by at least one of the one or more sensors. In some embodiments, the estimated position of the mobile device may be determined based on probabilistic models (e.g., implemented through a particle filter realized using the mobile device 200) using the outputs of the one or more sensors 212. As further shown in FIG. 2, in some embodiments, the one or more sensors 212 may also include a camera 212d (e.g., a charge-couple device (CCD)-type camera), which may produce still or moving images (e.g., a video sequence) that may be displayed on a user interface device, such as a display or a screen. Image data may also be used, in some embodiments, for navigation and location determination operations.

The processor(s) (also referred to as a controller) 210 may be connected to the local area network transceiver(s) 206, the wide area network transceiver(s) 204, the SPS receiver 208, and/or the one or more sensors 212. The processor may include one or more microprocessors, microcontrollers, and/or digital signal processors that provide processing functions, as well as other computation and control functionality. The processor 210 may also include storage media (e.g., memory) 214 for storing data and software instructions for executing programmed functionality within the mobile device. The memory 214 may be on-board the processor 210 (e.g., within the same IC package), and/or the memory may be external memory to the processor. Further details regarding an example embodiment of a processor or computation system, which may be similar to the processor 210, are provided below in relation to FIG. 4.

A number of software modules and data tables may reside in memory 214 and be utilized by the processor 210 in order to manage both communications with remote devices/nodes (such as the various access points depicted in FIG. 1), positioning determination functionality, and/or device control functionality. As will be described in greater details below, the processor 210 may also be configured, e.g., using software-based implementations, to control (e.g., modify, maintain, etc.) monitoring operations performed so as to monitor behavior of one or more activities/processes executing on the mobile device based on the determined location of the device in order to identify potential one or more security-risky activities/processes from the monitored one or more executing activities/processes. In some implementations, the monitoring operations are controlled based on a determination of whether the determined location is a private location or a public location, and/or whether the location is a secure location (e.g., a location with a heightened security sensitivity, such as a government building, where certain processes/activities are not permitted or are permitted at a reduced level only). Thus, in such implementations, location determination may include identifying whether the current position of the mobile device's location is within areas that are defined as secure areas, public areas, private areas, etc.

As illustrated in FIG. 2, memory 214 may include a positioning module 216, an application module 218, a received signal strength indicator (RSSI) module 220, a round trip time (RTT) module 222, a process monitoring module 226, and/or an analysis module 228. It is to be noted that the functionality of the modules and/or data structures may be combined, separated, and/or be structured in different ways depending upon the implementation of the mobile device 200. For example, the RSSI module 220, the RTT module 222, and/or any of the other modules, may each be realized, at least partially, as a hardware-based implementation, and may thus include such devices as a dedicated antenna (e.g., a dedicated RTT and/or RSSI antenna), a dedicated processing unit to process and analyze signals received and/or transmitted via the antenna(s) (e.g., to determine signal strength of a received signals, determine timing information in relation to an RTT cycle), etc.

The application module 218 may be a process running on the processor/controller 210 of the mobile device 200, which requests position information from the positioning module 216. Applications typically run within an upper layer of the software architectures, and may include indoor navigation applications, shopping applications, location aware service applications, etc. The positioning module 216 may derive the position of the mobile device 200 using information derived from various receivers and modules of the mobile device 200. For example, to determine the mobile device's position based on RTT measurements, reasonable estimates of processing time delays introduced by each access point may first be obtained and used to calibrate/adjust the measured RTTs. The measured RTTs may be determined by the RTT module 222, which can measure the timings of signals exchanged between the mobile device 200 and the access points to derive round trip time (RTT) information. Once measured, the RTT values may be passed to the positioning module 216 to assist in determining the position of the mobile device 200.

Other information that may be determined from communications received by the mobile device 200 (e.g., using one of its transceivers) includes the received signal power, which may be represented in the form of RSSI (determined using the RSSI module 220). The RSSI module 220 may thus also provide data regarding the signals to the positioning module 216. When using RSSI measurements to determine a mobile device's position, appropriate calibration/adjustment procedures may need to be performed. A determined position of the mobile device 200 may then be provided to the application module 218.

In some embodiments, the monitoring functionality of the device 200 may be implemented, at least in part, through a process monitoring module 226. The process monitoring module 226 implements (e.g., via software in this example, although the implementation can be realized alternatively or additional via hardware) a process, running on the processor/controller 210 of the mobile device 200, to monitor one or more of the various activities/processes performed by the device 200. As will be described in greater details below, the process module 226 implementation is configured to control monitoring functionality, e.g., track behavior of various activities and/or determine appropriate action based on the data procured through such monitoring, based, at least in part, on determined location of the device (the location of the device may be determined, for example, using the positioning module 216). The process monitoring module 226 may thus be configured, for example, to adjust one or more of monitoring frequency of one or more of the monitored process, level of detail obtained with respect to the monitored one or more processes, which activities/processes to monitor, etc., based on information relating to the location of the device (e.g., actual coordinates of the device, a determination of whether the device is located in a secure or non-secure area, etc.)

In some embodiments, the memory 214 may also include an analysis module 228 configured to identify whether one or more of the device's activities/processes being monitored may be a malicious or benign process. As will be discussed in greater details below, the analysis module may identify the activity/process type using activity-classification rules/processes. In some implementations, the analysis module 228 may include a machine learning implementation in which classification of the type of the activity/process behavior (e.g., as being malicious or benign) is learned dynamically learned over time.

In some embodiments, the mobile device 200 may also be configured to receive supplemental information that includes auxiliary position and/or motion data which may be determined from other sources (e.g., the one or more sensors 212). Such auxiliary position data may be incomplete or noisy, but may be useful as another source of independent information to enable position determination and/or other functionality. As illustrated in FIG. 2 (using dashed lines), mobile device 200 may optionally store auxiliary position/motion data 224 in memory which may be derived from information received from other sources as described below. Supplemental information may also include, but not be limited to, information that can be derived or based upon Bluetooth signals, beacons, RFID tags, and/or information derived from maps (e.g., receiving coordinates from a digital representation of a geographical map by, for example, a user interacting with a digital map).

The mobile device 200 may further include a user interface 250 which provides any suitable interface systems, such as a microphone/speaker 252, keypad 254, and a display 256 that allows user interaction with the mobile device 200. The microphone/speaker 252 provides for voice communication services (e.g., using the wide area network transceiver(s) 204 and/or the local area network transceiver(s) 206). The keypad 254 comprises any suitable buttons for user input. The display 256 comprises any suitable display, such as, for example, a backlit LCD display, and may further include a touch screen display for additional user input modes.

Figure 3:
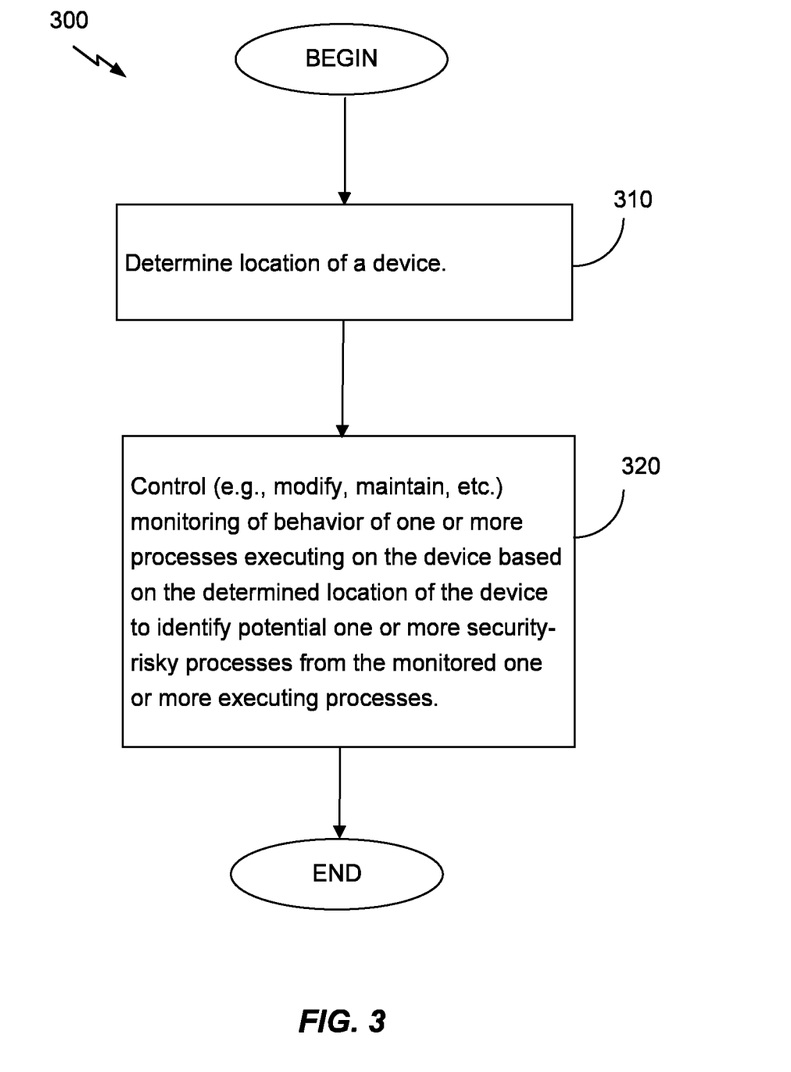
FIG. 3 is a flowchart of an example monitoring control procedure.

With reference now to FIG. 3, a flow chart of an example procedure 300 to control monitoring operations at a device of various processes performed by the device is shown. As illustrated, the example procedure 300 includes determining 310 location of a device (e.g., a device such as the device 108 or 200 of FIGS. 1 and 2, respectively). Generally, determining the device's location includes obtaining data to enable/facilitate location determination, and determining the location of the device based, at least in part, on the obtained data. In some embodiments, the location determination of the device may be performed by a module whose functionality is similar to that of the positioning module 216 depicted in FIG. 2. Accordingly, a mobile device at which the procedure 300 of FIG. 3 may be performed may be configured to receive signals from one or more remote transmitters such as any of the satellite and/or access points 102, 104, and/106 of FIG. 1 and to determine the receiving device's position based, for example, on multilateration techniques. For example, the positioning engine process 310 may be configured to determine RSSI or RTT parameters (e.g., using an RTT module, such as the RTT module 222 implemented in the example embodiment of the mobile device 200, and/or an RSSI module, such as the RSSI module 220 of the mobile device 200) associated with received signals from one or more remote transmitters, and based on the known locations of the remote transmitters to determine the position of the mobile device. In another example, the device's position may be determined based on signal profile identification techniques, e.g., by comparing determined parameter values of, for example, RSSI and/or RTT, to stored profiles that are associated with pre-determined positions.

In embodiments in which the device's location is determined based on such metrics as RSSI and/or RTT, measurements of signals received from one or more remote transmitters, e.g., access points (each of which may be identified by an access point identifier, such as a unique MAC address associated with the access point), can be used to determine an estimate of the device's location. For example, a database (which may be stored locally at a memory module housed on the device at which the procedure 300 is implemented), containing geographic locations, processing delays, power profiles, RTT profiles, and other such information for multiple access points with known geographical positions, may be accessed and relevant data (e.g., for particular transmitters/access points from which signals at the receiver were received) may be obtained. The database data so obtained may be used to facilitate location determination of the device. For example, the relative distances of the receiver receiving the signals from the transmitters/access points transmitting the signals may be determined based, at least in part, on known locations for those transmitters/access points stored on the accessed database, and an estimation of the location of the device may be computed/derived (e.g., using multilateration procedures, such as a trilateration procedure). As noted, in some embodiments, the position of the mobile device may be also be determined, for example, by comparing the actual measured values of signal strength (or RSSI) and RTT obtained from one or more access points, to stored profiles to identify a profile matching (approximately or precisely) the set of metric values determined by the mobile device. A location estimate associated with a matching stored profile may then be deemed to be an estimate of the current location of the device receiving the transmitters'/access points' signals.

In some embodiments, the mobile device on which the procedure 300 may be implemented may be operating inside an indoor environment where satellite signals and/or signals from WWAN access points are generally more difficult to receive, and therefore the location of the mobile device may be determined from signals received from one or more WLAN (e.g., WiFi devices, Bluetooth devices, femtocells, etc.), which may be similar to the WLAN access points 106a-e depicted in FIG. 1.

In some embodiments, the access points providing the signals based on which location determination procedures may be performed may be part of a QUIP™ (Qualcomm Indoor-Positioning System) implementation. In such embodiments, positioning determination may be performed as follows. Initially, an LCI discovery process is performed (an LCIs, or location context identifiers, refers to identifiers associated with such geographical areas as, for example, floors of a building). The discovery process causes transmission of a request to a server that identifies all LCIs. The discovery process results in determination of a coarse position of the mobile device based, for example, on MAC id's that are seen/detected by the mobile device. The server communicates a set of candidate LCIs to the mobile device with a list of access points. Following the LCI discovery process, an LCI disambiguation process is performed, where one or more criteria (such as the number of access points currently visible from each LCI, e.g., number of access points currently visible from each floor, maximum RSSI values from each LCI, median RSSI values from each LCI, etc.) may be applied to select an LCI from the candidate list. The chosen LCI represents a position estimate that is finer (i.e., has a lower uncertainty) than the position estimate resulting from the LCI discovery process. Once an LCI from a set of candidate LCIs, has been chosen, a positioning process based on, for example, RSSI and/or RTT may be performed. For example, targeted scans of access point(s), limited to those associated with the selected LCI, provide the RSSI or RTTs required to determine a position approximation for the mobile device's location.

Thus, a user carrying a mobile device may travel within an area (e.g., an indoor environment). To provide the user with a location-based service, an estimated position of the mobile device within the travelled area may be determined. As noted, a current estimated location of a mobile device may be determined, for example, via a position fix obtained using one or more location determination procedure, such as multilateration techniques, based on signals received from remote transmitters (e.g., access points) via one or more transceivers. For example, an implementation may process signals received from one or more access points, such as WiFi-based wireless access points (e.g., when operating in an indoor environment), via, for example, transceivers such as the transceiver 206 of the example device of FIG. 2. Based on such received signals, an initial location of the device may be determined. If the device cannot subsequently receive signals or other information from which a substantially accurate location of the device can be determined (e.g., because the receiver may be traveling in an indoor environment where such signals are not available), estimates of the device's location may be determined based on the last position determined using signals/information from remote devices/systems, the distance traveled (as provided by various on-board sensors such as an accelerometer, gyroscope, etc.), and/or a determined orientation (determined using one or more of the measurements of the sensors coupled to the receiver). In some embodiments, determination of the location of the device may be further facilitated by assistance data (e.g., local maps) provided from an assistance data database. For example, the position of the receiver determined using signals/information from remote devices/systems, as well as estimated locations of the device determined using, for example, a particle filter implementation, may be provided in terms of a local coordinate system corresponding to local maps provided from the assistance data database. Furthermore, the determined estimated location of the system may be presented on such local maps obtained from the assistance data database.

As noted, in some embodiments, determining the location of the mobile device may include identifying the type of area where the device is located, e.g., determining various characteristics of the location in which the device is located that are germane to control of the monitoring operations performed by the device. For example, in some embodiments, the location where the device is located may be determined to be one or more of, for example, a secure public location, a non-secure public location, a secure private location, and/or a non-secure private location. Other location types to define or characterize the determined location of the mobile device may also be used. For example, the characterization of secure/non-secure can be more finely defined using a scale (e.g., secure level 10, could be the highest level of security). As noted, the characterization of a location as being secure or non-secure may refer, in some embodiments, to the level of security sensitivity associated with the characterized location. For example, a secure area, be it private (e.g., premises of a private business) or public (premises of a government office), may refer to an area with low security tolerance for communication of data outside of the associated area.

Determination of the type of area the mobile device is determined to be located in may be facilitated by assistance data associated with the area. Assistance data (e.g., maps, data records arranged as a database with data about the general region where the mobile device is located, etc.) may thus be accessed to identify information corresponding to the determined location of the device. When the position of the device is determined (e.g., based on signals from remote transmitters, sensors' measurements, etc.) as geographic coordinates, as an LCI, or as some other value indicative of the location, assistance data information corresponding to the determined location is identified (and may be retrieved). Such assistance data information may include the type of area the device is located in. For example, in some embodiments, assistance data may include a map with grid points associated with geographic coordinates. That assistance data map may be divided into various sections that each includes such information as the type of area that map section is defined to be. In this example, upon determination of the mobile device's geographic coordinates, the assistance data for the general region (e.g., map of a building, map of a county, map of some other geographic area, etc.) is accessed (the assistance data may have been stored locally at the device, or may need to be accessed at a remote server). The part of the assistance data corresponding to the determined location is then identified. For example, a point/grid on an assistance data map that corresponds to the determined location of the mobile device (e.g., determined based on signals received from remote transmitter, sensors' measurements, etc.) is identified on the map, and the area type associated with that identified grid/point is obtained. As noted, in some embodiments, the area-type information may indicate whether the area is considered to be private or public, and/or whether it is secure/non-secure.

Turning back to FIG. 3, having determined the location of the device and/or the area-type where the mobile device is located, monitoring of behavior of one or more processes/activities executing on the device is controlled 320 based on the determined location of the device to, for example, identify potential one or more security-risky processes from the monitored one or more executing processes/activities. Processing corresponding to the operations 320 may thus include obtaining (e.g., receiving) the determined location, and controlling the monitoring functionality based on the obtained location.

Controlling the monitoring functionality (e.g., the monitoring operations performed on the device for the purpose of, among other things, identify and/or control security risky processes on the device) may include modifying/adjusting the monitoring operations, maintaining the monitoring operations at their current level and/or configuration, etc. As noted, the determined location based on which monitoring functionality is controlled may be provided as a global geographic position coordinates (e.g., relative to some global map that includes the area where the device is determined to be located), a position coordinates in a local map (e.g., a map of a building, a map of a floor of a building, a map of a shopping mall, a map of some specific region, etc.), a location context identifier, or as some other value/identifier representative of a location of the mobile device. For example, in some embodiments, the determined location may be provided as a location-type identifier, including such location type identifiers as secure, non-secure, public, or private. In such embodiments, the monitoring functionality may be controlled to operate in one of several modes corresponding to the discrete number of location-type identifiers. In other words, the monitoring behavior may, in some embodiments, have one particular functionality/configuration corresponding to locations determined to be private secure locations, another functionality/configuration corresponding to locations determined to be public secure locations, yet another functionality/configuration corresponding to locations determined to be private non-secure locations, and a further functionality/configuration corresponding to locations determined to be public non-secure locations.

Controlling monitoring functionality to monitor behavior of executing device processes or activities may include one or more of, for example:
  Adjusting frequency of the monitoring of one or more processes/activities executing on a mobile device based on the determined location of the device;
  Adjusting level of detail obtained for the monitored behavior of the one or more processes/activities executing on the device based on the determined location of the device; and/or
  Adjusting features being observed, including which of the one or more processes/activities executing on the device are to be monitored, based on the determined location of the device.

In some implementations, adjusting frequency of monitoring of the processes/activities executing on the device based on the determined location of the device may include increasing or decreasing the frequency of observation of processes/activities running on the device. For example, monitoring frequency may need to be increased when the device is determined to be in a public and/or a secure area. On the other hand, the frequency of monitoring the device's processes can be decreased if the device is determined to be located at the user's home. Frequency modification may be made for individual processes/activities that are to be monitored so that different monitoring frequencies may be used for different activities/processes. Thus, for example, monitoring frequency for data transfer activity may be increased (e.g., to some pre-determined level, or by some pre-determined factor) in response to a determination that the mobile device is presently located in area defined to be a private secure area (e.g., an area where unauthorized data transfer poses a risk). In contrast, monitoring frequency for another activity/process (e.g., camera use) at the present private-secure location may be modified by a different value or factor, and may result in an increased or decreased monitoring frequency for that activity/process.

As noted, controlling the monitoring functionality may also include, in some embodiments, adjusting level of detail obtained for the monitored behavior of the one or more processes/activities executing on the mobile device based on the determined location of the device. For example, when the device is determined to be located in a secure area, the type of monitoring detail obtained through the monitoring may be heightened, and may include information on when a particular observed event happened, how many times that observed event occurred, etc. On the other hand, when the device is determined to be located in a non-secure area, it may be enough to record information indicating whether a particular observed event happened or not, but without recording any further details for that event (e.g., when did it happen, etc.) Here too, modification/adjustment of the level of detail obtained for the monitored activities/processes may be made for individual processes/activities that are to be monitored so that different levels of details may be used for different activities/processes.

As also noted, controlling the monitoring functionality may include, in some embodiments, adjusting what features are being observed based on the determined location of the device. For example, in response to a determination that the device is located in a secure area, the behavior of the device's camera activities may be monitored (e.g., because capturing images in a secure area may be considered to be a security breach). However, if it is determined that the device is located in a non-secure area, then device's camera activity might not have to be monitored at all.

Modifying/adjusting the monitoring functionality may include selecting one of several data sets defining various modes of monitoring functionalities. For example, each data set may define one or more frequency values specifying the frequency at which various executing activities/processes need to be monitored, one or more detail parameters specifying how much details needs to be procured for various activities/processes at the particular monitoring modes, one or more features (e.g., activities/processes) that need to be monitored at the particular monitoring mode, etc. Monitoring operations may then be performed in accordance with the selected data set. In some implementations, modifying/adjusting monitoring functionality may include modifying values of certain parameters/values defining monitoring functionality, including modifying such parameters that define the frequency at which various executing activities/processes need to be monitored, the level of details that needs to be obtained through the monitoring operation, and which features need to be monitored.

In some embodiments, determination of whether monitored behavior of at least one of one or more processes executing on the device is to be classified as security-risky or not may also be based on the determined location. For example, rules (e.g., mapping rules) and other types of processes to determine whether at least one activity is benign or suspicious (e.g., potentially malicious process) can be controlled based on a mobile device's location. Thus, a particular device activity or process (e.g., data communication on a WiFi link, or some other process) may be determined to be benign (e.g., non-risky activity/process) when observed/monitored at a first location (which may be a location located at a non-secure area such as a user's home environment) because the classification rules/processes when applied at the first location result in a determination that the particular activity is not risky. On the other, if the particular activity is observed/monitored at a second location (e.g., a location associated with a secure area characterization), the classification rules/processes to classify activities (e.g., as risky or non-risky) may be such that when applied to data obtained through monitoring of device processes/activities at the second location (e.g., a secure area location) may result in a determination that the particular activity is risky.

Another example of identification of monitored device processes/activities as risky or non-risky based on the determined location of the mobile device is a situation in which a device is controlled to take a picture while sitting on a beach and uploading the picture to some social media site. This activity, when performed at a non-secure area such as the beach may result in a determination (through application of location-dependent classification rules/processes) that the activity is benign and non-risky behavior. Conversely, taking a picture while in a government building or other secure area may be determined (e.g., using one or more of the location-dependent classification rules/processes) to be non-benign (i.e., security-risky) behavior.

In some embodiments, the activity-classification rules/processes (e.g., to identify at least one activity behavior, from one or more activities/processes, as malicious/benign, and/or risky/non-risky) may include machine learning implementation in which determination of behavior type can be dynamically learned over time. Thus, the mobile device (or a remote system) may include a dynamically configurable learning/analysis module (which may be similar to the analysis module 228 of the device 200 depicted in FIG. 2) operable to recognize acceptable behavior as a function of location (e.g., learning that taking photos or recording audio may not be benign behavior in certain locations). In some implementations, such a machine learning module may be configured to iteratively analyze training input data (e.g., determined location associated with the input and an example monitored activity) and the training input data's corresponding output (e.g., classification information indicative of whether the input activity is deemed to be malicious or benign activity, or some other classification, at the input's associated location). Using the training data, such a machine learning module may be configured to derive functions, models, rules, processes, etc., that cause subsequent inputs of, for example, determined locations and certain activities/processes executable on the mobile device, to produce outputs (e.g., a classification of malicious/benign, risky/non-risky, etc.) that is consistent with the learning machine module's learned behavior. In some embodiments, the dynamically configurable learning machine module may enable configuration of the learning machine module for real-live data. For example, in response to actual inputs (such as a location and an activity), the learning machine module may prompt a user or technician to indicate whether the observed behavior should be deemed to be malicious or benign (or some other classification) at the present determined location. In some embodiments, the learning machine module may make an initial determination of whether for the given location and activity/process, the activity/process should be determined to be malicious or benign (or some other classification), and prompt a user or a technician to confirm or correct that initial determination.

In some embodiments, the learning machine implementation may be realized based as a neural network system. A neural network includes interconnected processing elements (effectively the systems' neurons). The connections between processing elements in the neural network have weights that cause output from one processing element to be weighed before being provided as input to the next interconnected processing elements. The weight values between connections can be varied, thereby enabling the neural network to adapt (or learn) in response to training data it receives. In some embodiments, the learning machine may be implemented as a support vector machine configured to generate, for example, classification functions or general regression function. In some embodiments, the learning machine may be implemented using support vector machines, decision trees techniques, regression techniques to derive best-fit curves, and/or other types of machine learning procedures/techniques.

In some embodiments, data obtained through the monitoring of device processes/activities (including determination, based on observed/monitored behavior of various device activities/processes, of whether those activities are benign or risky) may be used to cause certain actions to be implemented. For example, a determination that a particular activity/process is risky behavior (and thus may be a malicious process) may result in performance of one or more actions, including alerting an administrator of a potential security breach, disabling the activity/process (e.g., preventing or inhibiting the device from receiving or transmitting data via wireless communication links, disabling the device's camera), etc.

Figure 4:
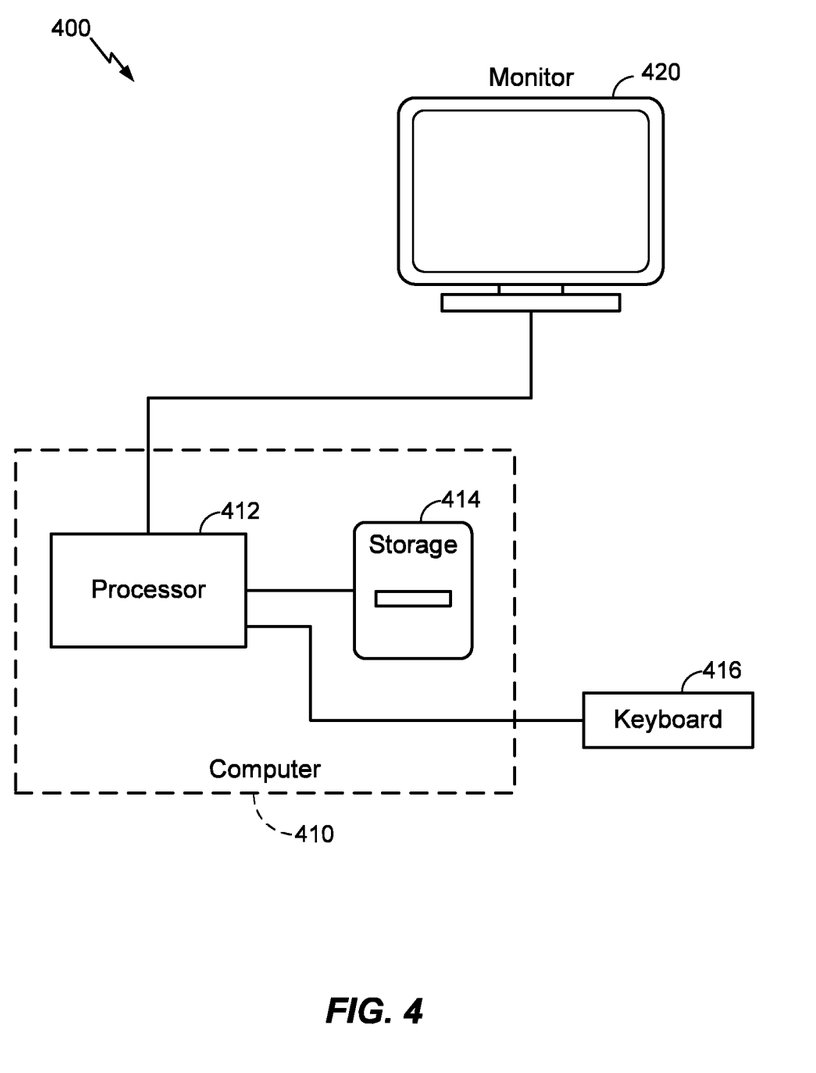
FIG. 4 is a schematic diagram of an example computing system.

Performing the procedures to determine location of a mobile device and control monitoring functionality of the mobile device based on the determined location may be facilitated by a processor-based computing system. With reference to FIG. 4, a schematic diagram of an example computing system 400 is shown. The computing system 400 may be housed in, for example, a handheld mobile device such as the devices 108 and 200 of FIGS. 1 and 2, respectively. The computing system 400 includes a processor-based device 410 such as a personal computer, a specialized computing device, and so forth, that typically includes a central processor unit 412. In addition to the CPU 412, the system includes main memory, cache memory and bus interface circuits (not shown). The processor-based device 410 may include a mass storage device 414, such as a hard drive and/or a flash drive associated with the computer system. The computing system 400 may further include a keyboard, or keypad, 416, and a monitor 420, e.g., a CRT (cathode ray tube) or LCD (liquid crystal display) monitor, that may be placed where a user can access them (e.g., a mobile device's screen).

The processor-based device 410 is configured to, for example, implement procedures to determine location of a mobile device (which may also include determining the area-type, e.g., secure, non-secure, etc., in which the device is located), and/or control monitoring of behavior of one or more processes/activities executing on the device based on the determined location of the device to identify potential one or more security-risky processes from the monitored one or more executing processes/activities. The mass storage device 414 may thus include a computer program product that when executed on the processor-based device 410 causes the processor-based device to perform operations to facilitate the implementation of the above-described procedures. The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 400. Other modules that may be included with the processor-based device 410 are speakers, a sound card, a pointing device, e.g., a mouse or a trackball, by which the user can provide input to the computing system 400. The processor-based device 410 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing unit or external to the processing unit. As used herein the term "memory" refers to any type of long term, short term, volatile, nonvolatile, or other memory and is not to be limited to any particular type of memory or number of memories, or type of storage media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver receiving signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:
   determining, by a mobile device, a location of the mobile device;
   providing, by the mobile device, the determined location of the mobile device as location data representative of an identifiable geographic region where the mobile device is located;
   determining, by the mobile device, a security type for an area corresponding to the identifiable geographic region where the mobile device is located;
   controlling, by the mobile device, adjustable monitoring operations to monitor behavior of one or more user-initiated processes for activities performed by the mobile device, the activities initiated by a user of the mobile device and executing on the mobile device, based on the determined security type for the area, the adjustable monitoring operations configured to identify potential one or more security-risky processes from the one or more user-initiated processes and further configured to provide data, with a level of information that depends on the determined security type for the area, for the one or more user-initiated processes, wherein controlling the adjustable monitoring operations further comprises adjusting which processes and which features of the one or more user-initiated processes to monitor based on the determined security type for the area, and wherein at least one of the one or more user-initiated processes for the activities performed by the mobile device causes a potential security risk;

identifying, by the mobile device, the monitored behavior of at least one of the one or more user-initiated processes executing on the mobile device as potentially malicious behavior based on the data provided by the adjustable monitoring operations and the determined security type for the area; and classifying, by the mobile device, the at least one of the one or more user-initiated processes as being a risky or non-risky activity based, at least in part, on whether the monitored behavior of the at least one of the one or more user-initiated processes is identified as potentially malicious behavior and based, at least in part, on the determined security type for the area.

2. The method of claim 1, wherein the one or more security-risky processes comprise one or more of:

a malicious process of a third party, or a process initiated by a user of the mobile device that causes a potential security risk.

3. The method of claim 1, wherein determining the location of the mobile device comprises:

determining one or more of: a global geographical position coordinates corresponding to the location of the mobile device, a location context identifier for the mobile device, or another identifier associated with the location of the mobile device.

4. The method of claim 1, wherein determining the security type for the area corresponding to the identifiable geographic region where the mobile device is located comprises:

determining the security type for the area as being one of: a secure public location, a non-secure public location, a secure private location, or a non-secure private location.

5. The method of claim 1, wherein controlling the adjustable monitoring operations to monitor the behavior of the one or more user-initiated processes executing on the mobile device based on the determined security type for the area comprises one or more of:

adjusting frequency of the monitoring operations to monitor the one or more user-initiated processes executing on the mobile device based on the determined security type for the area; or adjusting level of detail obtained for the monitored behavior of the one or more user-initiated processes executing on the mobile device based on the determined security type for the area.

6. The method of claim 5, wherein adjusting the frequency of the monitoring operations to monitor the one or more user-initiated processes executing on the mobile device comprises:

increasing the frequency of observation of at least one of the one or more user-initiated processes executing on the mobile device in response to a determination that the device is located in a secure area.

7. The method of claim 5, wherein adjusting the level of detail obtained for the monitored behavior of the one or more user-initiated processes executing on the mobile device comprises:

increasing the level of detail obtained for at least one of the one or more user-initiated processes executing on the mobile device in response to a determination that the device is located in a secure area.

8. The method of claim 1, wherein controlling the adjustable monitoring operations to monitor the behavior of the one or more user-initiated processes executing on the mobile device based on the determined security type for the area comprises:

adjusting features being observed for the monitored one or more user-initiated processes executing on the mobile device based on the determined security type for the area.

9. The method of claim 1, wherein identifying the monitored behavior of the at least one of the one or more user-initiated processes as potentially malicious behavior comprises:

identifying the monitored behavior of the at least one of the one or more user-initiated processes as potentially malicious behavior in response to a determination that number of uses of a particular feature exceeds a pre-determined threshold when the mobile device is determined to be in a secure area.

10. The method of claim 9, wherein the particular feature comprises at least one of: image capturing using a camera of the mobile device, or data transfer over a communication link between the mobile device and a remote device.

11. The method of claim 1, wherein identifying the monitored behavior of the at least one of the one or more user-initiated processes as potentially malicious behavior comprises:

identifying the monitored behavior of the at least one of the one or more user-initiated processes as potentially malicious behavior using a machine-learning procedure.

12. The method of claim 1, wherein identifying the monitored behavior of the at least one of the one or more user-initiated processes as potentially malicious behavior comprises:

identifying image capturing operations using a camera of the mobile device as being malicious behavior when the number of uses of the camera during a pre-determined time interval exceeds a pre-determined threshold and when the mobile device is determined to be in a secure area.

13. The method of claim 1, wherein controlling the adjustable monitoring operations to monitor the behavior of the one or more user-initiated processes comprises:

determining, from a plurality of activities performable on the mobile device, the one or more user-initiated processes to monitor.

14. A mobile device comprising:

one or more hardware-implemented processors; and storage media comprising computer instructions that, when executed on the one or more hardware-implemented processors, cause operations comprising:

determining a location of the mobile device;

providing the determined location of the mobile device as location data representative of an identifiable geographic region where the mobile device is located;

determining a security type for an area corresponding to the identifiable geographic region where the mobile device is located;

controlling adjustable monitoring operations to monitor behavior of one or more user-initiated processes for activities performed by the mobile device, the activities initiated by a user of the mobile device and executing on the mobile device, based on the determined security type for the area, the adjustable monitoring operations configured to identify potential one or more security-risky processes from the monitored one or more user-initiated processes and further configured to provide data, with a level of information that depends on the determined security type for the area, for the one or more user-initiated processes, wherein controlling the adjustable monitoring operations further comprises adjusting which processes and which features of the one or more user-initiated processes to monitor based on the determined security type for the area, and wherein at least one of the one or more user-initiated processes for the activities performed by the mobile device causes a potential security risk;

identifying the monitored behavior of at least one of the one or more user-initiated processes executing on the mobile device as potentially malicious behavior based on the data provided by the adjustable monitoring operations and the determined security type for the area; and classifying the at least one of the one or more user-initiated processes as being a risky or non-risky activity based, at least in part, on whether the monitored behavior of the at least one of the one or more user-initiated processes is identified as potentially malicious behavior and based, at least in part, on the determined security type for the area.

15. The mobile device of claim 14, wherein the one or more security-risky processes comprise one or more of:

a malicious process of a third party, or a process initiated by a user of the mobile device that causes a potential security risk.

16. The mobile device of claim 14, wherein determining the location of the mobile device comprises:

determining one or more of: a global geographical position coordinates corresponding to the location of the mobile device, a location context identifier for the mobile device, or another identifier associated with the location of the mobile device.

17. The mobile device of claim 14, wherein determining the security type for the area corresponding to the identifiable geographic region where the mobile device is located comprises:

determining the security type for the area as being one of: a secure public location, a non-secure public location, a secure private location, or a non-secure private location.

18. The mobile device of claim 14, wherein controlling the adjustable monitoring operations to monitor the behavior of the one or more user-initiated processes executing on the mobile device based on the determined security type for the area comprises one or more of:

adjusting frequency of the monitoring operations to monitor the one or more user-initiated processes executing on the mobile device based on the determined security type for the area; or adjusting level of detail obtained for the monitored behavior of the one or more user-initiated processes executing on the mobile device based on the determined security type for the area.

19. The mobile device of claim 18, wherein adjusting the frequency of the monitoring operations to monitor the one or more user-initiated processes executing on the mobile device comprises:

increasing the frequency of observation of at least one of the one or more user-initiated processes executing on the mobile device in response to a determination that the device is located in a secure area.

20. The mobile device of claim 18, wherein adjusting the level of detail obtained for the monitored behavior of the one or more user-initiated processes executing on the mobile device comprises:

increasing the level of detail obtained for at least one of the one or more user-initiated processes executing on the mobile device in response to a determination that the device is located in a secure area.

21. The mobile device of claim 14, wherein controlling the adjustable monitoring operations to monitor the behavior of the one or more user-initiated processes executing on the mobile device based on the determined security type for the area comprises:

adjusting features being observed for the monitored one or more user-initiated processes executing on the mobile device based on the determined security type for the area.

22. The mobile device of claim 14, wherein identifying the monitored behavior of the at least one of the one or more user-initiated processes as potentially malicious behavior comprises:

identifying the monitored behavior of the at least one of the one or more user-initiated processes as potentially malicious behavior in response to a determination that number of uses of a particular feature exceeds a pre-determined threshold when the mobile device is determined to be in a secure area.

23. The mobile device of claim 22, wherein the particular feature comprises at least one of: image capturing using a camera of the mobile device, or data transfer over a communication link between the mobile device and a remote device.

24. The mobile device of claim 14, wherein identifying the monitored behavior of the at least one of the one or more user-initiated processes as potentially malicious behavior comprises:

identifying the monitored behavior of the at least one of the one or more user-initiated processes as potentially malicious behavior using a machine-learning procedure.

25. An apparatus comprising:

means for determining a location of a mobile device;

means for providing the determined location of the mobile device as location data representative of an identifiable geographic region where the mobile device is located;

means for determining a security type for an area corresponding to the identifiable geographic region where the mobile device is located;

means for controlling adjustable monitoring operations to monitor behavior of one or more user-initiated processes for activities performed by the mobile device, the activities initiated by a user of the mobile device and executing on the mobile device, based on the determined security type for the area, the adjustable monitoring operations configured to identify potential one or more security-risky processes from the monitored one or more user-initiated processes and further configured to provide data, with a level of information that depends on the determined security type for the area, for the one or more user-initiated processes, wherein the means for controlling the adjustable monitoring operations further comprises means for adjusting which processes and which features of the one or more user-initiated processes to monitor based on the determined security type for the area, and wherein at least one of the one or more user-initiated processes for the activities performed by the mobile device causes a potential security risk;

means for identifying the monitored behavior of at least one of the one or more user-initiated processes executing on the mobile device as potentially malicious behavior based on the data provided by the adjustable monitoring operations and the determined security type for the area; and means for classifying the at least one of the one or more user-initiated processes as being a risky or non-risky activity based, at least in part, on whether the monitored behavior of the at least one of the one or more user-initiated processes is identified as potentially malicious behavior and based, at least in part, on the determined security type for the area.

26. The apparatus of claim 25, wherein the one or more security-risky processes comprise one or more of:
a malicious process of a third party, or a process initiated by a user of the mobile device that causes a potential security risk.

27. The apparatus of claim 25, wherein the means for determining the location of the mobile device comprise:
means for determining one or more of: a global geographical position coordinates corresponding to the location of the mobile device, a location context identifier for the mobile device, or another identifier associated with the location of the mobile device.

28. The apparatus of claim 25, wherein the means for determining the security type for the area corresponding to the identifiable geographic region where the mobile device is located comprise:
means for determining the security type for the area as being one of: a secure public location, a non-secure public location, a secure private location, or a non-secure private location.

29. The apparatus of claim 25, wherein the means for controlling the adjustable monitoring operations to monitor the behavior of the one or more user-initiated processes executing on the mobile device based on the determined security type for the area comprise one or more of:
means for adjusting frequency of the monitoring operations to monitor the one or more user-initiated processes executing on the mobile device based on the determined security type for the area; or
means for adjusting level of detail obtained for the monitored behavior of the one or more user-initiated processes executing on the mobile device based on the determined security type for the area.

30. The apparatus of claim 29, wherein the means for adjusting the frequency of the monitoring operations to monitor the one or more user-initiated processes executing on the mobile device comprise:
means for increasing the frequency of observation of at least one of the one or more user-initiated processes executing on the mobile device in response to a determination that the device is located in a secure area.

31. The apparatus of claim 29, wherein the means for adjusting the level of detail obtained for the monitored behavior of the one or more user-initiated processes executing on the mobile device comprise:
means for increasing the level of detail obtained for at least one of the one or more user-initiated processes executing on the mobile device in response to a determination that the device is located in a secure area.

32. The apparatus of claim 25, wherein the means for controlling the adjustable monitoring operations to monitor the behavior of the one or more user-initiated processes executing on the mobile device based on the determined security type for the area comprise:
means for adjusting features being observed for the monitored one or more user-initiated processes executing on the mobile device based on the determined security type for the area.

33. The apparatus of claim 25, wherein the means for identifying the monitored behavior of the at least one of the one or more user-initiated processes as potentially malicious behavior comprise:
means for identifying the monitored behavior of the at least one of the one or more user-initiated processes as potentially malicious behavior in response to a determination that number of uses of a particular feature exceeds a pre-determined threshold when the mobile device is determined to be in a secure area.

34. The apparatus of claim 33, wherein the particular feature comprises at least one of: image capturing using a camera of the mobile device, or data transfer over a communication link between the mobile device and a remote device.

35. The apparatus of claim 25, wherein the means for identifying the monitored behavior of the at least one of the one or more user-initiated processes as potentially malicious behavior comprise:
means for identifying the monitored behavior of the at least one of the one or more user-initiated processes as potentially malicious behavior using a machine-learning procedure.

36. A non-transitory processor readable media programmed with a set of instructions executable on a processor that, when executed, cause operations comprising:
determining a location of a mobile device;
providing the determined location of the mobile device as location data representative of an identifiable geographic region where the mobile device is located;
determining a security type for an area identifiable geographic region where the mobile device is located;
controlling adjustable monitoring operations to monitor behavior of one or more user-initiated processes for activities performed by the mobile device, the activities initiated by a user of the mobile device and executing on the mobile device, based on the determined security type for the area, the adjustable monitoring operations configured to identify potential one or more security-risky processes from the monitored one or more user-initiated processes and further configured to provide data, with a level of information that depends on the determined security type for the area, for the one or more user-initiated processes, wherein controlling the adjustable monitoring operations further comprise adjusting which processes and which features of the one or more user-initiated processes to monitor based on the determined security type for the area, and wherein at least one of the one or more user-initiated processes for the activities performed by the mobile device causes a potential security risk;
identifying the monitored behavior of at least one of the one or more user-initiated processes executing on the mobile device as potentially malicious behavior based on the data provided by the adjustable monitoring operations and the determined security type for the area; and
classifying the at least one of the one or more user-initiated processes as being a risky or non-risky activity based, at least in part, on whether the monitored behavior of the at least one of the one or more user-initiated processes is identified as potentially malicious behavior and based, at least in part, on the determined security type for the area.

37. The processor readable media of claim 36, wherein the one or more security-risky processes comprise one or more of:
- a malicious process of a third party, or a process initiated by a user of the mobile device that causes a potential security risk.

38. The processor readable media of claim 36, wherein determining the location of the mobile device comprises:
- determining one or more of: a global geographical position coordinates corresponding to the location of the mobile device, a location context identifier for the mobile device, or another identifier associated with the location of the mobile device.

39. The processor readable media of claim 36, wherein determining the security type for the area corresponding to the identifiable geographic region where the mobile device is located comprises:
- determining the security type for the area as being one of: a secure public location, a non-secure public location, a secure private location, or a non-secure private location.

40. The processor readable media of claim 36, wherein controlling the adjustable monitoring operations to monitor the behavior of the one or more user-initiated processes executing on the mobile device based on the determined security type for the area comprises one or more of:
- adjusting frequency of the monitoring operations to monitor the one or more user-initiated processes executing on the mobile device based on the determined security type for the area; or
- adjusting level of detail obtained for the monitored behavior of the one or more user-initiated processes executing on the mobile device based on the determined security type for the area.

41. The processor readable media of claim 40, wherein adjusting the frequency of the monitoring operations to monitor the one or more user-initiated processes executing on the mobile device comprises:
- increasing the frequency of observation of at least one of the one or more user-initiated processes executing on the mobile device in response to a determination that the device is located in a secure area.

42. The processor readable media of claim 40, wherein adjusting the level of detail obtained for the monitored behavior of the one or more user-initiated processes executing on the mobile device comprises:
- increasing the level of detail obtained for at least one of the one or more user-initiated processes executing on the mobile device in response to a determination that the device is located in a secure area.

43. The processor readable media of claim 36, wherein controlling the adjustable monitoring operations to monitor the behavior of the one or more user-initiated processes executing on the mobile device based on the determined security type for the area comprises:
- adjusting features being observed for the monitored one or more user-initiated processes executing on the mobile device based on the determined security type for the area.

44. The processor readable media of claim 36, wherein identifying the monitored behavior of the at least one of the one or more user-initiated processes as potentially malicious behavior comprises:
- identifying the monitored behavior of the at least one of the one or more user-initiated processes as potentially malicious behavior in response to a determination that number of uses of a particular feature exceeds a pre-determined threshold when the mobile device is determined to be in a secure area.

45. The processor readable media of claim 44, wherein the particular feature comprises at least one of: image capturing using a camera of the mobile device, or data transfer over a communication link between the mobile device and a remote device.

46. The processor readable media of claim 36, wherein identifying the monitored behavior of the at least one of the one or more user-initiated processes as potentially malicious behavior comprises:
- identifying the monitored behavior of the at least one of the one or more user-initiated processes as potentially malicious behavior using a machine-learning procedure.

* * * * *